United States Patent [19]

Williams, Jr. et al.

[11] 4,340,940
[45] Jul. 20, 1982

[54] HARDWARE REDUCTION BY TRUNCATION OF SELECTED NUMBER OF MOST SIGNIFICANT BITS FOR DIGITAL VIDEO SYSTEM USING SUBSAMPLING AND ADAPTIVE RECONSTRUCTION

[75] Inventors: James J. Williams, Jr., Plainsboro; Robert A. Dischert, Burlington, both of N.J.

[73] Assignee: RCA Corporation, New York, N.Y.

[21] Appl. No.: 181,425

[22] Filed: Aug. 26, 1980

[51] Int. Cl.³ ............................................... G06F 7/02
[52] U.S. Cl. ................................... 364/745; 340/146.2
[58] Field of Search ..................... 340/146.2; 364/769, 364/745; 358/11, 12

[56] References Cited

U.S. PATENT DOCUMENTS 4,101,903 7/1978 Slay ................................. 340/146.2
4,149,261 4/1979 Harigaya et al. .................... 364/745

*Primary Examiner*—Charles E. Atkinson
*Attorney, Agent, or Firm*—P. J. Rasmussen; W. H. Meise; H. I. Steckler

[57] ABSTRACT

In order to reduce the amount of hardware required in comparing 8-bit numbers representing digitized video signals, only the four LSB are compared, since if the numbers differ by more than the four LSB, no comparison is desired. This is done by detecting if any of the four MSB are logic "1", and if so, setting all of the four LSB to logic "1".

8 Claims, 5 Drawing Figures

ORIGINAL SAMPLING OF THE PICTURE

SUBSAMPLED VERSION OF THE PICTURE

ENCODER

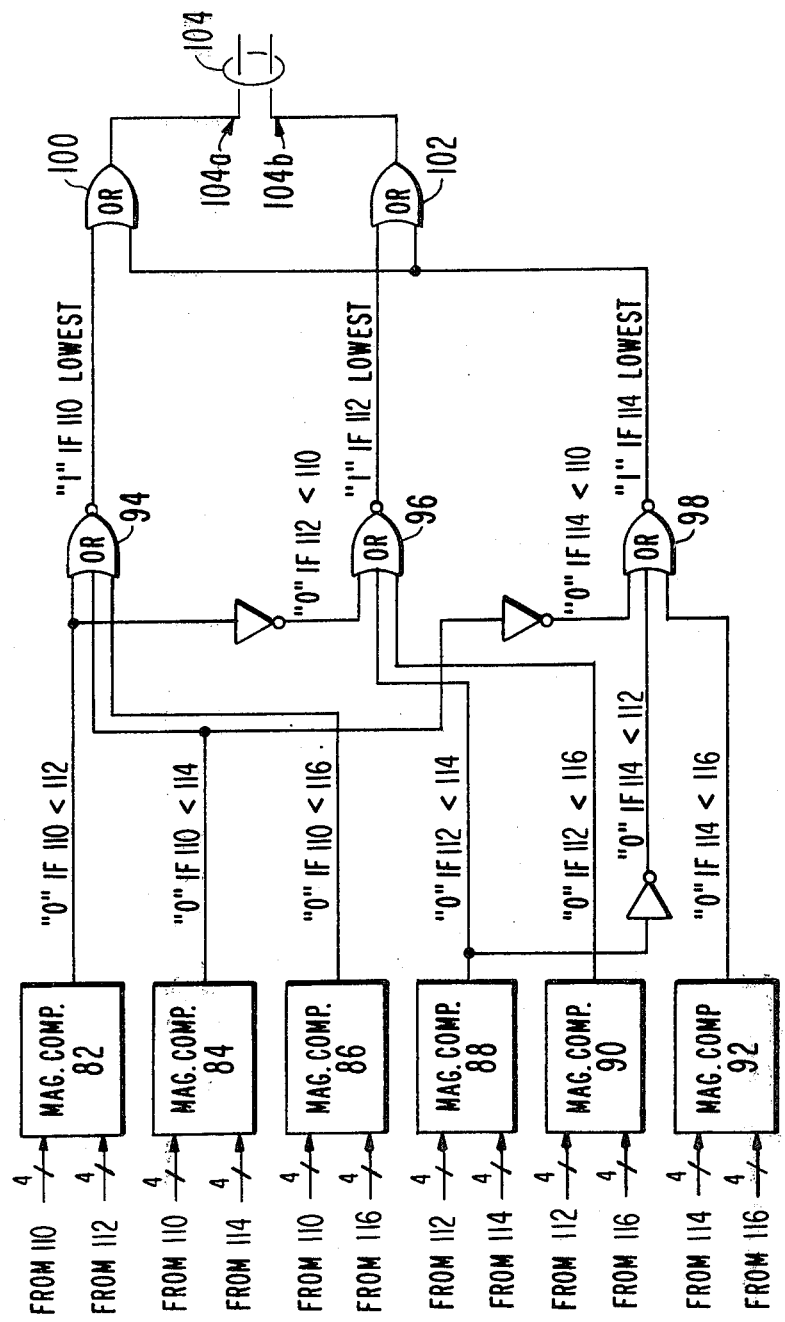

HARDWARE REDUCTION BY TRUNCATION OF SELECTED NUMBER OF MOST SIGNIFICANT BITS FOR DIGITAL VIDEO SYSTEM USING SUBSAMPLING AND ADAPTIVE RECONSTRUCTION

BACKGROUND OF THE INVENTION

The present invention relates to digital video systems, and more particularly, to circuits for reducing the hardware required in such systems.

In digital broadcast systems, the effective use of the data rate is of primary importance. A reduction in data rate reduces both video tape usage and the necessary transmission bandwidth; however, this must be accomplished while maintaining broadcast quality pictures.

One method of data rate reduction which is presently under consideration is the process of sub-Nyquist sampling, such as is disclosed in the paper "Sub-Nyquist Encoded PCM NTSC Color Television" by John P. Rossi in the book "Digital Video", a review of SMPTE papers, and in the article by Leonard S. Golding, "Frequency Interleaved Sampling of a Color Television Signal", IEEE Transactions on Communication Technology, Volume COM-19, page 972, December 1971. These sub-Nyquist type systems have samples with the diagonal distance between the samples being greater than the horizontal distance between the samples. Since the smaller the distance between samples the greater the resolution, these systems are capable of increasing the horizontal resolution which is available at a given data rate, but at the expense of the diagonal resolution.

A system for overcoming this disadvantage is shown in U.S. patent application Ser. No. 132,137, filed March 20, 1980, (RCA 74,547), now abandoned in favor of continuation application Ser. No. 168,077, filed July 14, 1980 (RCA 74,547A), both entitled "Data Rate Reduction For Digital Video Signals By Subsampling And Adaptive Reconstruction." The method of said applications comprises dividing a signal into first and second time portions, transmitting the first portion, and transmitting a control signal adapted to control the reconstruction of said second portion from the transmitted first portion. However, the embodiment of the invention of said prior applications may require a large amount of circuitry.

It is therefore desired to reduce the amount of hardware in a Digital Video System.

SUMMARY OF THE INVENTION

The present invention is a method for comparing at least two plural bit numbers representing a digitized television signal with a reference plural bit number, said method comprising determining if any of selected most significant bits of said two numbers has a selected state, and setting the remaining least significant bits of the number with the most significant bits having said selected state to said selected state.

DESCRIPTION OF THE DRAWINGS

FIG. 5 shows a block diagram of a minimum-error logic circuit used in FIG. 3.

DETAILED DESCRIPTION OF THE INVENTION

Figure 1:
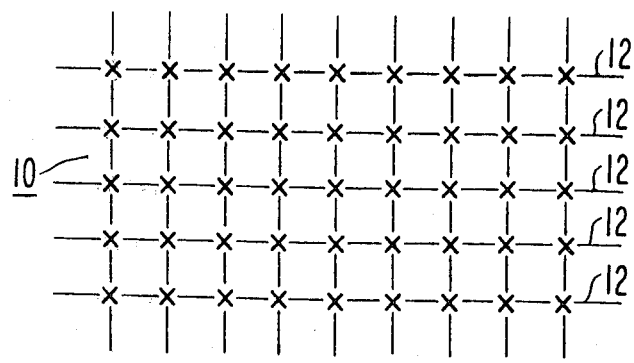
FIG. 1 illustrates a raster produced by simultaneous vertical and horizontal scanning of an electron beam with sample points thereon.

FIG. 1 shows a video raster 10 comprising a plurality of horizontal scanning lines 12. Each of the letters "X" represents a sampling point, which typically is 8-bit or byte sampled for a total of 256 gray levels. These sampling points occur in a preferred embodiment at 14.32 MHz, which is four times the NTSC color subcarrier frequency. This sampling rate results in horizontally adjacent samples occurring at about 70 nanosecond intervals.

Figure 2:
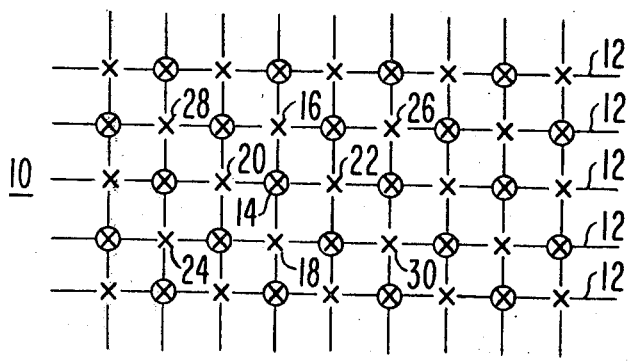
FIG. 2 illustrates a sub-sampled version of the same raster.

FIG. 2 is a similar drawing wherein corresponding elements have been given corresponding reference numerals. Here each circled "X" represents samples which will not be transmitted or recorded. For each sample that is not so transmitted or recorded, various combinations of the spatially surrounding samples are computed and compared to the sample not transmitted. For example, the sample representing point 14 is compared with the average of the sampled points above and below it, namely points 16 and 18. It is also compared to the average of points to its left and right, namely points 20 and 22. The sample representing point 14 is also compared to the average of the transmitted points 24 and 26 which are in one diagonal relationship to it, and also to the average of transmitted points 28 and 30 which are in another diagonal relationship to it. Whichever comparison provides the closest match is indicated by "steering" or control bits. These control bits are transmitted as additional bits along with the samples that represent the uncircled points in FIG. 2, and together with those samples, are used by a decoder to reconstruct a high resolution picture from reduced data rate information.

Figure 3:
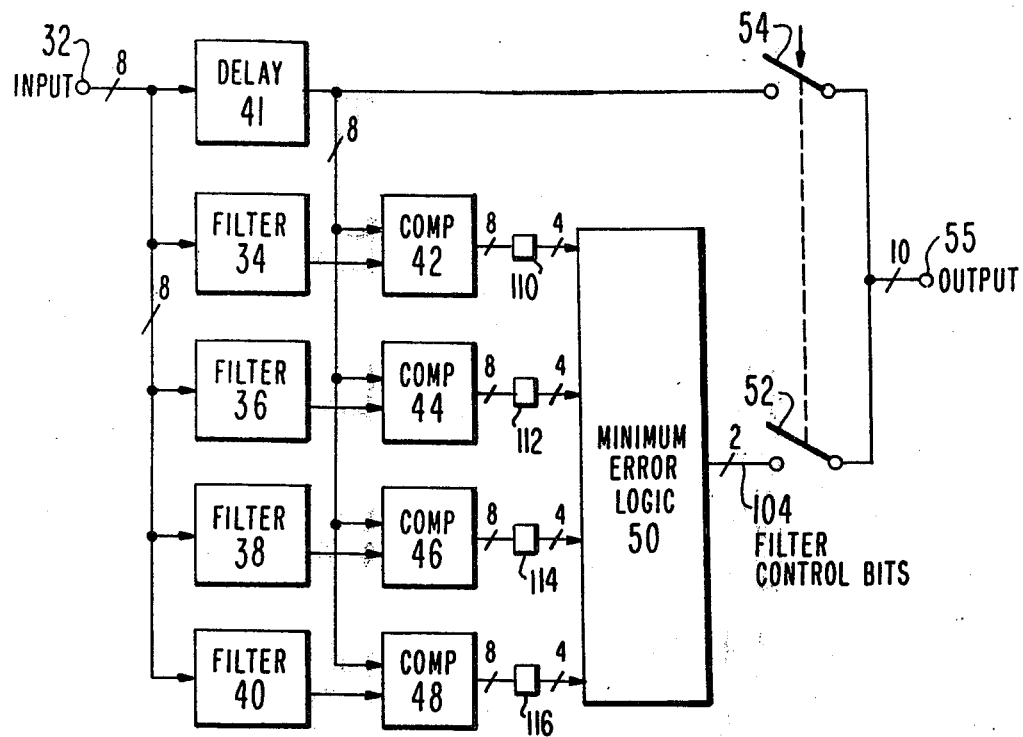
FIG. 3 illustrates a block diagram of an encoder for encoding samples of a video signal and control signals.

FIG. 3 shows an encoder for achieving this. An input 32 receives the digital video signal having samples occurring, in a particular embodiment, at 14.32 MHz (every 70 nanoseconds) with 8 bits per sample. The 8 bits of each sample are applied to a delay line 41 and to filters 34, 36, 38 and 40. These filters are used to provide the average of the surrounding samples. By "average" is meant adding together the values represented by the two signals and dividing the resulting sum by two. For example, filter 34 provides the average of points 28 and 30 (a "first diagonal" average). As is known in the art, it may comprise an 8 bit digital delay line (not shown), having a delay of two horizontal lines, or about 127 microseconds, plus four samples, or about 280 nanoseconds in the NTSC system. The undelayed input signal and the output signal of the delay line are averaged within filter 34, and then fed to a comparator 42. Delay line 41 has a delay of about 63.5 microseconds plus 140 nanoseconds, i.e. one-half of the total delay of delay line of filter 34, by delay the sample that is not transmitted so it will be in time coincidence with the averaged signal from filter 34 so the two signals can be compared by comparator 42. Assuming filter 36 supplies the average of points 20 and 22 (a "horizontal" average), it can comprise an 8-bit digital delay line having delay of 2 samples or about 140 nanoseconds. The input (undelayed) and output (delayed) signals of this delay line are averaged. An additional equalizing delay of one line plus 70 nanoseconds to compensate for the delay of delay line 41 is first provided within filter 36. The output signal of filter 36 is supplied to a comparator 44. Assuming filter 38 supplies the average of diagonal points 24 and 26 (a "second diagonal" average), it can comprise first a 280 nanosecond delay equalizer and then an 8-bit digital delay line having a delay of two horizontal lines minus 280 nanoseconds. The delayed and undelayed signals at the input and output of said delay line are averaged and the digital signal representing the average of the signal at points 24 and 26 is then applied to a comparator 46. Lastly, assuming that filter 40 supplies the average of points 16 and 18 (a "vertical" average), it can comprise first a 140 nanosecond delay equalizer, and then an 8-bit digital delay line having a delay of two horizontal lines. The delayed and undelayed signals at the input and output of said delay line are averaged, and then the output signal is supplied to a comparator 48. Comparators 42, 44, 46 and 48 each comprise a subtractor that also receives the original 8-bit samples through delay line 41 in addition to the outputs of the filters 34, 36, 38 and 40, respectively. The respective two signals in each comparator are subtracted and then the absolute value is taken of the resulting difference. The comparators 42, 44, 46, 48 apply 8-bit absolute value signals to truncation circuits 110, 112, 114 and 116, which truncation circuits apply 4-bit absolute-value signals to a minimum error logic circuit 50.

The invention works on the following criterion. If any of the differences between said averages of the surrounding points and said point 14 in question equals or exceeds sixteen quantizing levels, that average is effectively not considered as a possible replacement for untransmitted point 14 since due to the high redundancy of video information, another difference will probably be less. This can greatly reduce the amount of hardware required in circuit 50.

Figure 4:
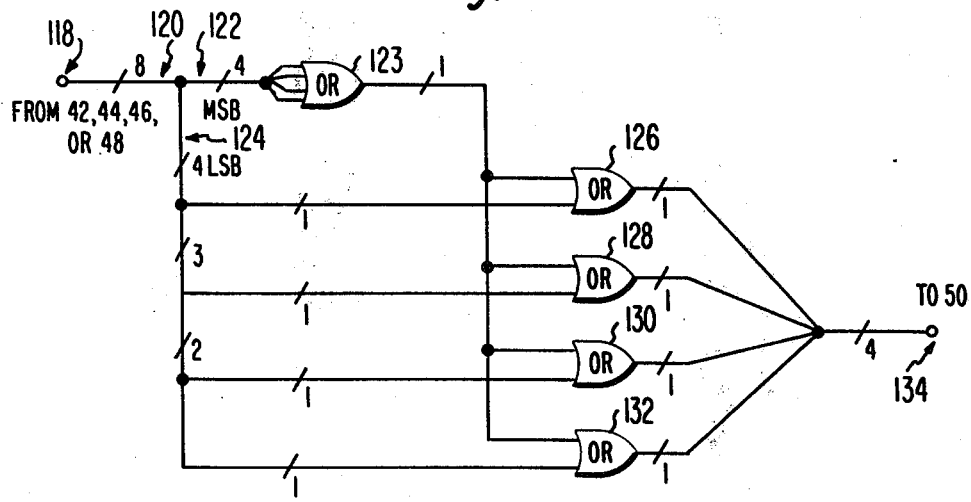
FIG. 4 is a block diagram of an embodiment of the present invention used in FIG. 3 for reducing the amount of hardware required.

FIG. 4 shows a block diagram representing each of the identical truncation circuits 110, 112, 114 and 116 for carrying out the above criterion. Eight-bit input 118 is coupled to the 8-bit output of comparator 42, 44, 46 or 48. An 8-bit bus 120 divides into two 4-bit busses, bus 122 conveys the four most significant bits (MSB) to respective inputs of four-input OR gate 123, while 4-bit bus 124 carries the four least significant bits (LSB) to respective first inputs of OR gates, 126, 128, 130 and 132. The output of gate 123 is coupled to the remaining second inputs of gates 126, 128, 130 and 132. The outputs of gates 126–132 are coupled to four-bit output 134, which output is in turn coupled to minimum error logic circuit 50.

In operation, if at least any of the four most significant bits of the difference signal applied to gate 123 are logic "1" (which corresponds to a difference of at least sixteen quantizing levels), the output of gate 123 is logic "1", and thus a logic "1" is applied to all of the first inputs of gates 126, 128, 130 and 132. Hence, the output signals from all of said gates is logic "1" regardless of the state of the signals at their second inputs. The binary number 1111 (equivalent to decimal 15) is applied to the corresponding input of minimum error logic circuit 50. Binary 1111 only requires four 4-bit buses as inputs of circuit 50 instead of four 8-bit buses as in said prior application. Since due to redundancy, another difference is probably smaller, the direction of that smaller difference will be indicated by circuit 50, as explained below.

As shown in FIG. 5, minimum error logic circuit 50 comprises six 4-bit magnitude comparators 82, 84, 86, 88, 90 and 92, each of which receives two 4-bit numbers from different pairs of the output signals of truncation circuits 110, 112, 114 and 116 and supplies at its respective output a one-bit logic level indication to indicate which of the two respective input numbers is smaller. It should be noted that there are only six possible combinations of four numbers taken in pairs, thus giving rise to the six magnitude comparators. It is only necessary to look at three of the magnitude comparator outputs to determine if a specific magnitude comparator input is the lowest. Thus NOR gates 94, 96 and 98 are used to detect if the output signal from truncation circuits 110, 112 and 114, respectively, are the lowest. If none are the lowest, the output signal from 116 is assumed to be the lowest, which will be true, or none will be lowest, i.e. they are all equal, in which latter case the output signal from any comparator will do. The output signals from gates 94, 96, and 98 are coded by OR gates 100 and 102 into a 2-bit control signal on bus 104 in accordance with the following truth table:

| Line No. | Lowest Signal | | | |
| --- | --- | --- | --- | --- |
|  | 110 | 112 | 114 | 116 |
| 104a | 1 | 0 | 1 | 0 |
| 104b | 0 | 1 | 1 | 0 |

The output of logic circuit 50 comprises two bits in accordance with the above table which indicate which of the pairs of samples of adjacent points is the closest match, i.e. represents which direction has the least change of the video signal around the sample point 14. This two-bit signal makes up the control signal indicating which of the transmitted video sample signals most closely represents the untransmitted video signal so that complete video information can be obtained upon decoding. The two control bits are applied to a switch 52 in FIG. 3, which is a two-bit switch operated in synchronization with an 8-bit switch 54 in FIG. 3 at a 7.16 MHz switching rate. This switching rate, since it is 14.32 MHz divided by 2, causes switch 54 to pass or transmit only every other 8-bit sample. The 2 control bits from logic circuit 50, that indicate which of the adjacent samples are to be used in reconstructing the untransmitted points, are passed by switch 52, and together with the 8 bits simultaneously passed by switch 54 representing a transmitted point, form a 10-bit parallel word at 10-bit parallel output 55.

It will be appreciated that due to the presence of truncation circuits 110, 112, 114 and 116, magnitude comparators 82, 84, 86, 88, 90 and 92 are 4-bit comparators instead of the 8-bit comparators of said prior application for the same 8-bit quantization of the analog video signal. This is a large hardware reduction.

It will be obvious to those skilled in the art that other embodiments of the invention are possible. For example, more or less than four digits may be truncated for corresponding hardware reduction, and alternative logic configurations may be used to accomplish the truncation.

What is claimed is:

1. In a method for comparing at least two plural bit numbers representing a digitized television signal with a reference plural bit number, said method comprising determining if any of selected most significant bits of numbers representing the differences between said two plural bit numbers and said reference plural bit number respectively has a selected state, and setting the remaining least significant bits of the number with the most significant bits having said selected state to said selected state.

2. A method as claimed in claim 1 wherein said selected state comprises logic one.

3. A method as claimed in claim 1 wherein said two plural bit numbers each comprise eight bits and said most and least significant bits each comprise four bits.

4. In an apparatus for comparing at least two plural bit numbers representing a digitized television signal with a reference plural bit number, said apparatus for comparing comprising determining means for determining if any selected most significant bits of numbers representing the difference between said two plural bit numbers and said reference plural bit number respectively has a selected state, and means for setting the remaining least significant bits of the number with the most significant bits having said selected state to said selected state.

5. An apparatus as claimed in claim 4 wherein said selected state comprises logic one.

6. An apparatus as claimed in claim 4 wherein said two plural bit numbers each comprise eight bits and said most and least significant bits each comprise four bits.

7. An apparatus as claimed in claim 4 wherein said determining means comprises an OR gate having one input for each of said most significant bits of one of said numbers representing the difference.

8. An apparatus as claimed in claim 4 wherein said setting means comprises a plurality of OR gates equal in number to the number of said least significant bits, each gate having a first input coupled to receive said least significant bits, respectively, and a second input coupled to said determining means.

* * * * *